United States Patent [19]

Schubert et al.

[11] 4,074,574

[45] Feb. 21, 1978

[54] POSTAGE METER CONVERSION APPARATUS

[75] Inventors: Keith E. Schubert, Rowayton; Louis T. Canevari, Norwalk, both of Conn.

[73] Assignee: Pitney-Bowes, Inc., Stamford, Conn.

[21] Appl. No.: 669,529

[22] Filed: Mar. 23, 1976

[51] Int. Cl.² .................................................. F16H 5/96

[52] U.S. Cl. ......................................... 74/335; 74/344; 74/89

[58] Field of Search ...................... 74/477, 335, 89.16, 74/89.18, 89, 344; 222/36; 221/7

[56] References Cited

U.S. PATENT DOCUMENTS

| | | | |
|---|---|---|---|
| 1,980,644 | 11/1934 | Vandervoort | 74/477 |
| 2,538,407 | 1/1952 | Binder | 74/335 |
| 3,047,347 | 7/1962 | Groves | 221/7 |
| 3,534,637 | 10/1970 | Tomlinson | 74/477 |
| 3,935,435 | 1/1976 | Greenwood | 222/36 |

*Primary Examiner*—Samuel Scott

*Assistant Examiner*—Wesley S. Ratliff, Jr.

*Attorney, Agent, or Firm*—Robert S. Salzman; William D. Soltow, Jr.; Albert W. Scribner

[57] ABSTRACT

A postage meter conversion apparatus is disclosed that will convert a mechanical, lever operated postage meter into an electrically controlled postage meter. The conversion apparatus is easily assembled and disassembled from a standard lever operated postage meter. Each lever of the meter is operated in a sequential manner. The conversion apparatus is so constructed that only one lever of the meter can be actuated at any time in the sequence. Optical monitors are provided to monitor the operation of the conversion unit so that any possible errors in the setting of the postage amount may be determined. The conversion apparatus can be used to make the mechanical meter compatible in an electrical environment containing equipment such as a computer, a digital scale, and other postage system processing devices.

9 Claims, 8 Drawing Figures

POSTAGE METER CONVERSION APPARATUS

This invention pertains to postal equipment, and more particularly to a conversion unit for making a standard mechanical postage meter compatible in an electrical environment.

BACKGROUND OF THE INVENTION

With more and more processing equipment becoming electrically controlled, a need is emerging for converting mechanical postal systems and equipment to electrical control.

Because present federal law prevents the direct electrical redesign of a postage meter, the invention concerns itself with the logical alternative, viz., a conversion attachment.

While conversion attachments are not new per se, the present invention features a novel mechanism packaged as a unit which provides ease of adaptability, assembly, reliability and low cost of manufacture.

SUMMARY OF THE INVENTION

The invention relates to a postage meter conversion apparatus for converting a lever operated mechanical postage meter to an electrically controlled postage meter.

The inventive conversion unit comprises a drive shaft having a cylindrical rack on one end, and a plurality of spaced apart drive gears on the opposite end of the shaft. The shaft and gears are made to rotate by means of a first motor. A second motor drives a pinion which acts upon the cylindrical rack to provide axial movement of the shaft. When the shaft is caused to move axially, the gears on the shaft are shifted to various new actuating positions. An output shaft carries a number of corresponding gears as the drive shaft. The output gears are each individually rotatably engageable with, and driven by, one of the gears on the drive shaft. Both sets of gears are spaced apart on their corresponding shafts in such a manner that only one output gear at a time can be driven.

Each of the output gears controls a lever of the mechanical postage meter. An extension link extends from each output gear. A cross bar connects between each link and a lever of the meter. Each lever and each link travel through arcuate paths that are substantially opposite. This causes the cross bars to move in substantial translation.

The conversion unit is easily assembled to the postage meter and its surrounding housing. The conversion apparatus allows the mechanical meter to be electrically controlled by a computer or a digital scale, etc.

It is an object of this invention to provide an improved conversion apparatus for operating a mechanical postage meter by electrical control;

It is another object of the invention to provide a conversion unit for a postage meter which is easy to assemble;

It is a further object of this invention to provide a reliable low cost conversion unit for electrically controlling a standard mechanical postage meter.

These and other objects of the invention will become more apparent and will be better understood with reference to the following detailed description taken in conjunction with the attached drawings, in which:

FIG. 1 is a perspective in situ view of the conversion apparatus of the invention mounted upon a postage meter.

FIGS. 1*a* through 1*d* are sequential schematic views of the meshing of the gears shown in cutaway in FIG. 1;

Figure 1:
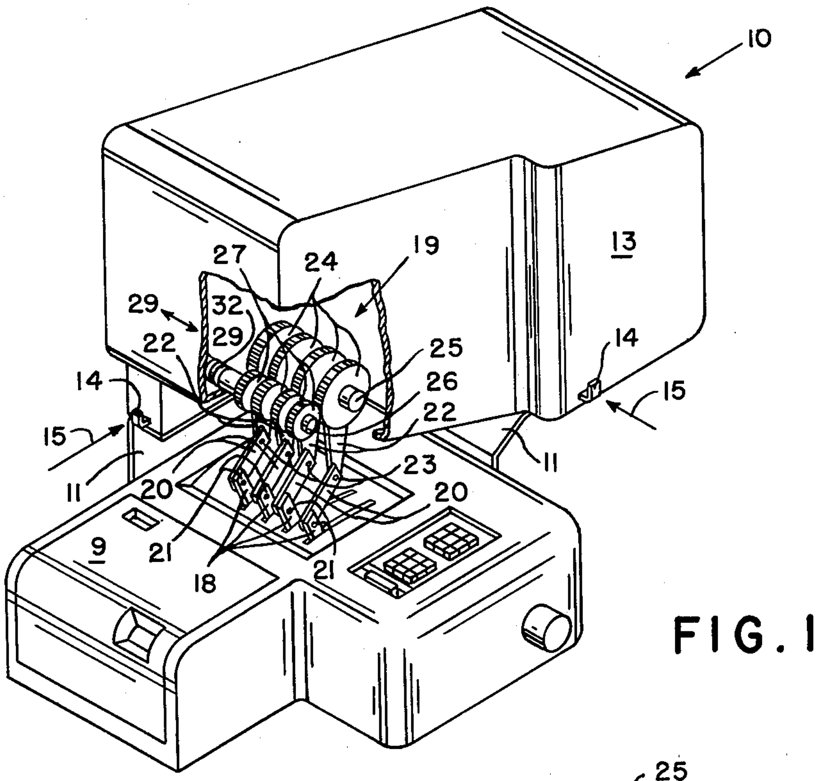

Now referring to FIG. 1, a standard lever operated postage meter 9 is shown supporting the inventive conversion unit shown generally by arrow 10. The postage meter is one of a standard issue, and known commercially as one belonging to the 5300 Model Series, manufactured by Pitney Bowes, Inc., Stamford, Conn.

Figure 3:
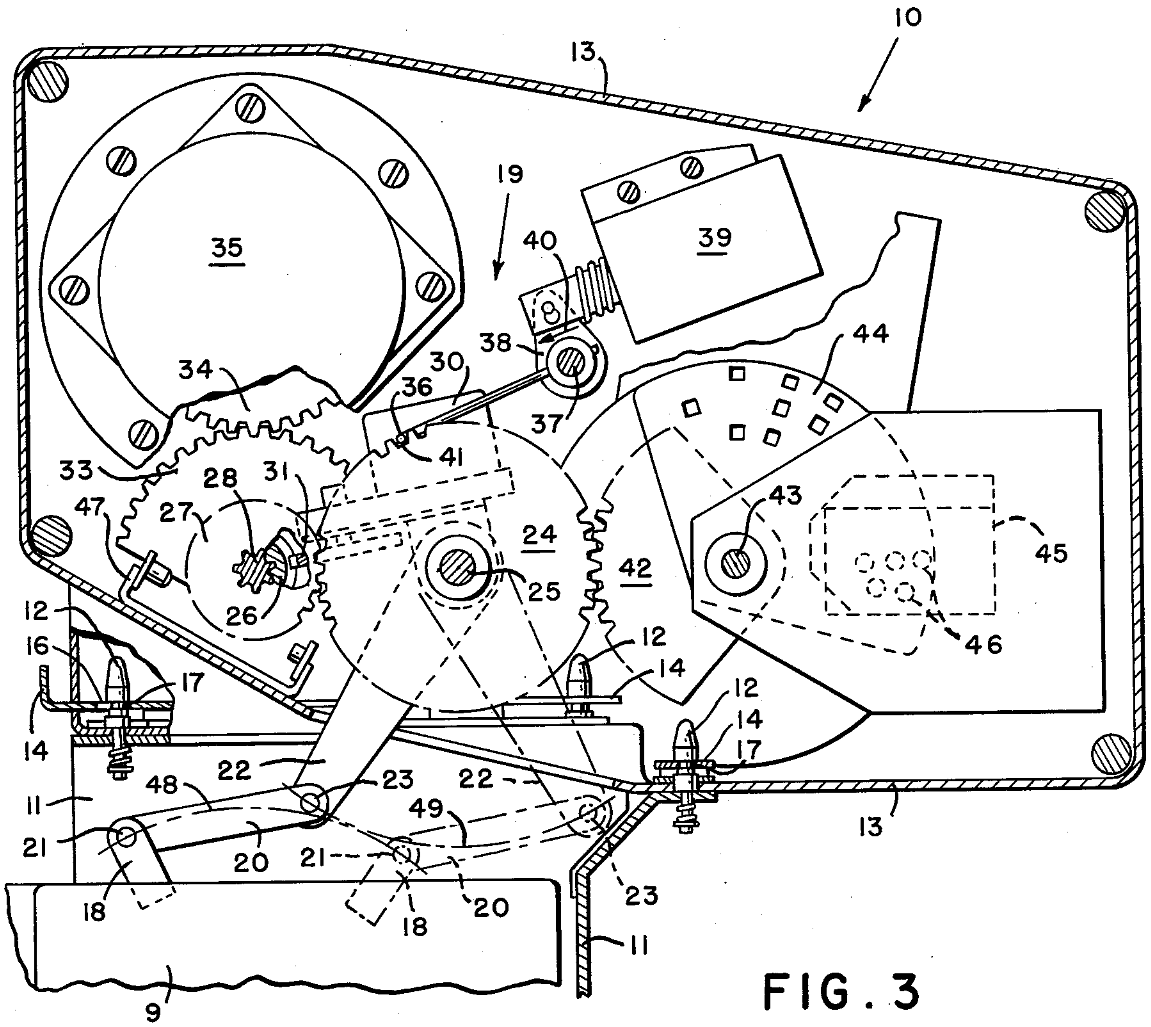
FIG. 3 is a side view of the mechanism shown in FIG. 2 with the surrounding mounting fixtures and housings.

The conversion unit 10 attaches to the meter 9 by means of an intermediate cowling 11 that fastens about meter 9 (also see FIG. 3). The cowling 11 has locating pins 12 (FIG. 3) that project into locating holes in housing 13 of the conversion unit 10. Plungers 14 are initially extended to align internal locating holes 16 (FIG. 3) with pins 12. Plungers 14 are then depressed (arrow 15) to lock around the necked portion 17 (FIG. 3) of pins 12, in order to tightly secure housing 13 to the cowling 11.

Figure 2:
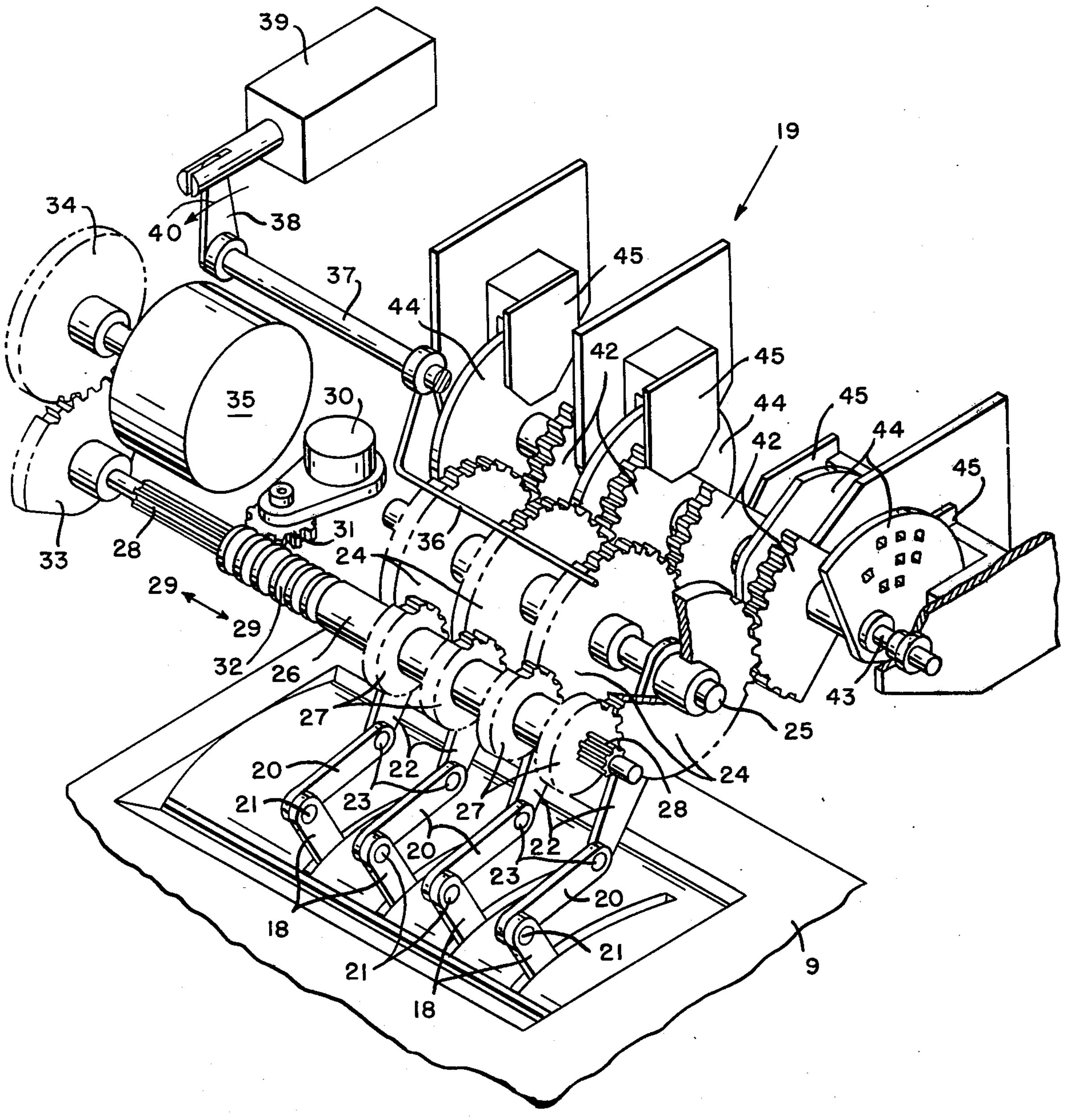
FIG. 2 is a perspective view of the internal mechanism of the conversion apparatus shown in FIG. 1.

The setting levers 18 of meter 9 are secured to the conversion unit's internal mechanism 19 shown partially in FIG. 1, and in more detail in FIGS. 2 and 3, by means of cross bars 20. The cross bars 20 are pivotably pinned to levers 18 by means of pins 21. The other end of the cross bars 20 are pinned to gear extensions 22 via pins 23 (FIGS. 1, 2 and 3).

Each gear extension 22 is rotatively affixed to drivable gears 24 about output shaft 25. The output or drivable gears 24 are sequentially and individually rotated by engagement with drive gears 27 disposed upon shaft 26.

The output gears 24 and the drive gears 27 are spaced apart with respect to each other, such that when any one of the drive and output gears mesh, none of the other gears of this group mesh. This aspect of the gear drive will be better understood hereinafter with reference to FIGS. 1*a* through 1*d*.

Shaft 26 is slidable (arrows 29) upon the inner splined shaft 28, in order to position the gears 27 to their individual actuating positions (meshing relationships with gears 24).

Figure 4:
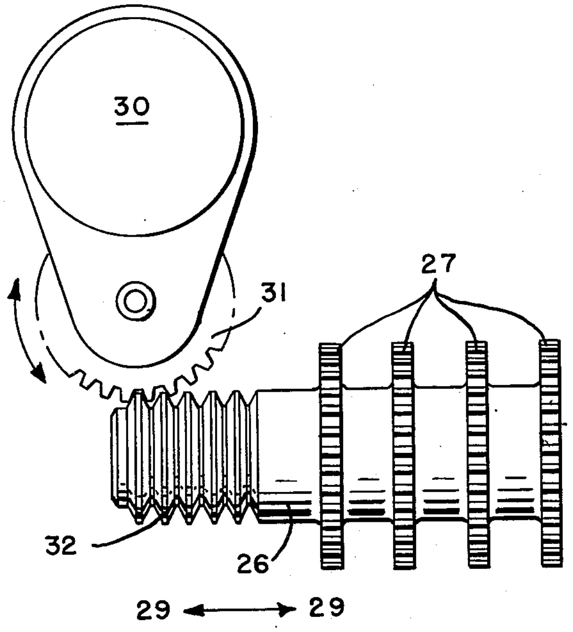
FIG. 4 is a top view of the drive shaft of the mechanism shown in FIG. 2.

Shaft 26 is axially moved along shaft 28 by means of a gear motor 30 (FIGS. 2–4), that drives pinion gear 31. Pinion gear 31, in turn drives shaft 26, by meshing with the cylindrical rack 32 disposed on the far end of shaft 26.

A gear 33 is disposed on the far end of shaft 28 as shown. Gear 33 meshes with drive gear 34, which is rotatively driven by motor 35. Thus, motor 35 will rotate shaft 28 via gears 33 and 34.

OPERATION OF THE INVENTION

Operation of the conversion unit 10 will be explained with particular reference to FIGS. 1*a* through 1*d* and 3.

Each lever 18 of postage meter 9 is set to a given postage amount, i.e. the numerical amount ranges from 0–9 for cents, 10 cents, dollars, and tens of dollars. Naturally, the meter may contain more or less banks (levers).

The particular four banks shown here is only for illustrative purposes.

Figure 1A:
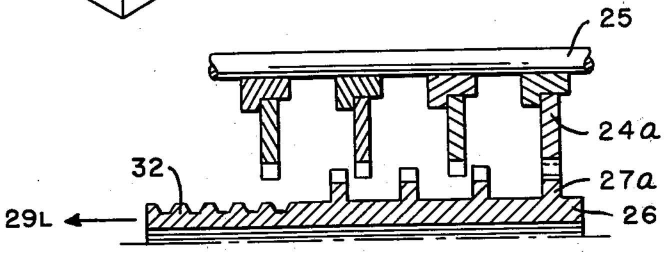
Figure 1B:
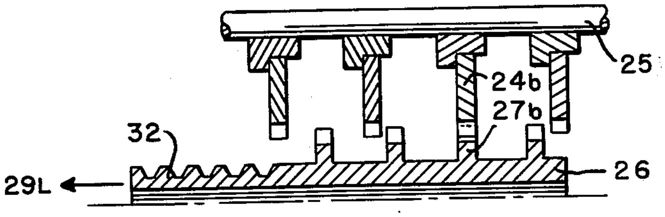
Figure 1C:
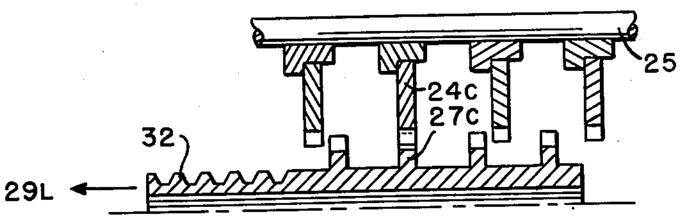
Figure 1D:
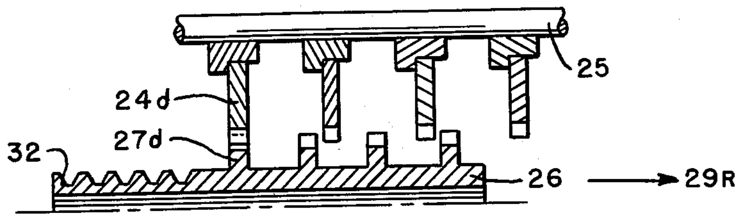

As aforementioned, each lever 18 is set to a given amount by an associated gear 24, which is driven by a corresponding gear 27. Gears 24 and 27 mesh in a sequential manner. Referring to FIGS. 1*a* through 1*d*, a schematic diagram of the meshing arrangement of gear sets 24 and 27 is shown. FIG. 1*a* depicts the first gear pair 24*a*, 27*a* in meshing relationship. As will be noted, all the other gear pairs are off-set (non-aligned). After gear 27*a* drives (rotates) gear 24, shaft 26 is caused to move axially upon shaft 28 (arrow 29L) to a second actuating gear position, as illustrated in FIG. 1*b*. In this position, the second pair 24*b*; 27*b* of gears are brought into meshing engagement. As will again be noted, all the other gears are in a non-engaging position.

Gears 24*b* and 27*b* are now rotated to provide a new setting for its associated lever 18 (second lever in the set).

Shaft 26 is then shifted (arrow 29L) a second time to a third position (FIG. 1*c*), which brings the third gear pair 24*c*; 27*c* into rotative engagement. Again, none of the other gears are engaged. The meshing gears 24*c* and 27*c* are rotatively set, and the shaft 26 is shifted to the last gear position shown in FIG. 1*d*. After the last pair (24*d*; 27*d*) of gears are set, the shaft is shifted back (to the right as depicted by arrow 29R) to the position illustrated in FIG. 1*a*. This completes the setting procedure for all four meter banks (levers 18).

As is clearly shown, the meshing relationship of all the gear pairs 24 and 27 is such, that only one pair will mesh at any of the positions shown in FIGS. 1*a*–1*d*. This is so, because each of the gear sets 24 and 27, respectively, are spaced apart in a given manner to provide this result.

During the shifting of the shaft 26, it is necessary to lock the gears 24 and 27 from rotation, so that each successive gear pair will achieve meshing engagement. Gears 27 will naturally be locked against rotation, because splined shaft 28 will not be rotating shaft 26, and hence gears 27. The splined shaft 28 will act as a natural guide for the locked axial movement of shaft 26 and gears 27.

Gears 24 on the other hand, have no such means to prevent their rotation. Thus, it is necessary to provide a lock mechanism against their rotation during the shifting of shaft 26. This is acomplished by locking bar 36 depicted in FIGS. 2 and 3. Locking bar 36 is an U-shaped arm which is secured to pivotable shaft 37. Shaft 37 is caused to pivot via bell crank 38, which is pivotably deactuated by spring-loaded solenoid 39.

During the shifting of shaft 26 (arrow 29) solenoid 39 is deactuated to pivot (arrow 40) bell crank 38. This causes shaft 37 to turn, and forces locking bar 36 to set within the gear teeth 41 (FIG. 3) of the gears 24. This prevents the rotation of gears 24 until the next meshing position is achieved. At such time, the solenoid 39 is actuated to release the bar 36 from locking engagement with gears 24.

In order to monitor the rotative positions of gears 24, and hence, the amount set for each meter bank (levers 18), a third set of gears 42 is provided. Gears 42 are individually rotatively mounted upon shaft 43. As each gear 24 is rotatively set, its corresponding gear 42 is also rotated a like amount. Each of the follower gears 42 has its rotation monitored by a code wheel 44, which is rotatively fixed to each of these gears. Optical wells 45 detect the position of each wheel 44 by means of photodetectors and light emitting diodes 46 (shown in side view in FIG. 3).

Thus, the rotation of gears 24 will be detected, because of the detection of the corresponding rotation of follower gears 42.

In addition to the detection of the gear movements, it is also desirable to monitor the axial movement of shaft 26. This is accomplished by means of four LED and photodetector units 47 (only one unit depicted in FIG. 3). One of these units is mounted opposite each actuation position, i.e. each position shown for mating gear pairs 24*a*; 27*a*, 24*b*; 27*b*, 24*c*; 27*c*, etc., FIGS. 1*a*–1*d*.

In the meshing condition, each gear pair 24, 27 will break the light path in its corresponding detection unit 47.

The invention also features a novel movement for elements 18, 20, and 22, as will be described with reference to FIG. 3.

As will be seen, each of the levers 18 move in an arcuate path 48. In order to provide a compact linkage structure, the gear extensions 22 are each designed to have an arcuate path 49 opposite to that of path 48. This results in a translational movement for cross-bars 20.

Having thus described the invention, what is desired to be protected by Letters Patent is hereby presented by the appended claims.

What is claimed is:

1. A postage meter conversion apparatus for converting a lever operated mechanical postage meter into an electrically controlled postage meter, said conversion apparatus comprising:

- a drive shaft having a cylindrical rack on one end thereof, and a plurality of spaced apart drive gears on an opposite end thereof;
- a first motor operatively connected to said drive shaft for rotatively driving said drive shaft and each of said drive gears;
- a pinion gear in driving engagement with said rack of said drive shaft for axially moving said drive shaft to a number of drive gear actuating positions;
- a second motor operatively connected to said pinion gear for rotatively driving said pinion gear to axially move said drive shaft; and
- an output shaft having a plurality of spaced apart, drivable gears, each of said drivable gears being operatively connected to a lever of said postage meter, each of the drivable gears being individually driven by one of said drive gears, each drive gear being associated with a particular drivable gear and being in rotative engagement therewith as said drive shaft is caused to axially move to a particular drive gear actuating position.

2. The postage meter conversion apparatus of claim 1, wherein each drivable gear is rotatively engageable with a corresponding drive gear in a sequential manner as the drive shaft is caused to axially move to each particular drive gear actuating position in sequence.

3. The postage meter conversion apparatus of claim 2, wherein each drive gear is arranged upon the drive shaft in a corresponding manner with the drivable gears of said output shaft such that only one drivable gear can be rotatively driven in a particular drive gear actuating position of said drive shaft.

4. The postage meter conversion apparatus of claim 1, further comprising locking means in operative engagement with said drivable gears, when said drive shaft is being moved axially, for locking the drivable gears against rotative movement, when said drive shaft is not in a drive gear actuating position, whereby alignment is insured between the drive and drivable gears.

5. The postage meter conversion apparatus of claim 1, further comprising drive shaft monitoring means in operative association with the drive gears for monitoring the number of drive gear actuating positions.

6. The postage meter conversion apparatus of claim 1, further comprising output shaft monitoring means in operative association with the drivable gears for monitoring a rotative position of each of the drivable gears.

7. The postage meter conversion apparatus of claim 1, wherein said drive shaft is operatively connected to said first motor via a splined shaft that connects to the first motor and fits within said drive shaft, whereby the drive shaft is capable of being axially moved upon the splined shaft and rotatively driven thereby.

8. The combination of a lever operated mechanical postage meter having a number of levers to set postage, and a conversion apparatus for converting the mechanical postage meter into an electrically controlled postage meter, the combination comprising an electrical driving motor, a set of rotatable gears operatively connected to said electrical motor and rotatable thereby, means for individually actuating each gear of said set for rotation by said motor, an extension link extending from each gear, a cross bar connected between each link and a lever of said postage meter, each of said extension links travels through an arcuate path as each gear is caused to rotate, each corresponding lever of said postage meter travels through a substantially opposite arcuate path as does its associated link as said associated link is caused to move through its arcuate path, and each connecting cross bar moves in substantial translation as its associated link and lever traverse through substantially opposite arcuate paths.

9. The combination of claim 8, further comprising monitoring means associated with each gear for monitoring the amount of postage being set by each lever of said postage meter.

* * * * *